(12) United States Patent
Ito et al.

(10) Patent No.: US 11,270,562 B2
(45) Date of Patent: Mar. 8, 2022

(54) VIDEO SURVEILLANCE SYSTEM AND VIDEO SURVEILLANCE METHOD

(71) Applicant: Hitachi, Ltd., Tokyo (JP)

(72) Inventors: Yoshiki Ito, Tokyo (JP); Kenichi Morita, Tokyo (JP); Tomokazu Murakami, Tokyo (JP); Junichi Kimura, Tokyo (JP); Keisuke Terada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/020,893

(22) Filed: Sep. 15, 2020

(65) Prior Publication Data

US 2021/0256823 A1   Aug. 19, 2021

(30) Foreign Application Priority Data

Feb. 18, 2020   (JP) .............................. JP2020-025733

(51) Int. Cl.
*G08B 13/19* (2006.01)
*G08B 13/196* (2006.01)
(Continued)

(52) U.S. Cl.
CPC ... *G08B 13/19602* (2013.01); *G06K 9/00342* (2013.01); *G06K 9/00718* (2013.01);
(Continued)

(58) Field of Classification Search
CPC . G08B 13/19602; G06K 9/00718; G06T 7/73
See application file for complete search history.

(56) References Cited

U.S. PATENT DOCUMENTS

2009/0319560 A1* 12/2009 Cheng ..................... G06F 16/70
2012/0116202 A1   5/2012 Bangera et al.
(Continued)

FOREIGN PATENT DOCUMENTS

CN   106384093 A    2/2017
CN   110378281 A1  10/2019
(Continued)

OTHER PUBLICATIONS

Extended European Search Report received in corresponding European Application No. 20196102.6 dated Mar. 4, 2021.
(Continued)

*Primary Examiner* — Girumsew Wendmagegn
(74) *Attorney, Agent, or Firm* — Mattingly & Malur, PC

(57) ABSTRACT

An efficient alert process is realized and effectiveness of surveillance is improved when surveilling various incidents that occur within a surveillance area. In a video surveillance system for detecting a plurality of incidents in a surveillance area using a video that captured the surveillance area, provided are a calculation unit which detects an image of a person and/or an object from the video, and calculates an incident feature quantity as a feature quantity representing a status of a detected person and/or a feature quantity of a detected object, and a determination unit which detects an occurrence of the incident based on the incident feature quantity, and determines subjects to be alerted of an occurred incident, which is a detected incident, from a type of the occurred incident and a determination accuracy of the occurred incident.

9 Claims, 11 Drawing Sheets

(51) Int. Cl.
*G06T 7/73* (2017.01)
*G06K 9/00* (2022.01)
(52) U.S. Cl.
CPC ............ *G06K 9/00771* (2013.01); *G06T 7/73* (2017.01); *G06K 2009/00738* (2013.01)

(56) References Cited

U.S. PATENT DOCUMENTS

| | | | |
|---|---|---|---|
| 2016/0351031 A1 | 12/2016 | Jo et al. | |
| 2017/0109991 A1* | 4/2017 | Kusens | G06K 9/00335 |
| 2018/0137362 A1* | 5/2018 | Danielsson | G06K 9/00744 |
| 2020/0394384 A1* | 12/2020 | Singh | G06K 9/00771 |

FOREIGN PATENT DOCUMENTS

| | | |
|---|---|---|
| JP | 2017-028561 A | 2/2017 |
| JP | 2018-190199 A | 11/2018 |
| JP | 6534499 B1 | 6/2019 |
| WO | 2020/189313 A1 | 9/2020 |

OTHER PUBLICATIONS

Clift, L. G. et al., "Autonomous computational-intelligence based behaviour recognition in security and surveillance", Proceedings of SPIE, Oct. 8, 2018, pp. 108020L-1-108020L-7.
Singaporean Search Report and Written Opinion received in corresponding Singaporean Application No. 10202008946Q dated Nov. 12, 2021.

* cited by examiner

FIG.6A

SURVEILLANCE IMPORTANCE DETERMINATION STANDARD

| INCIDENT CLASSIFICATION | SURVEILLANCE IMPORTANCE |
|---|---|
| HAND-OVER OF BAGGAGE | MEDIUM |
| CLIMB-OVER OF FENCE | MEDIUM |
| FALLING DOWN | LOW |
| SCUFFLE | HIGH |
| ... | |

EVENT DETERMINATION STANDARD

| EVENT | SURVEILLANCE IMPORTANCE (HIGH) | SURVEILLANCE IMPORTANCE (MEDIUM) | ... | INCIDENT CLASSIFICATION (BREAKUP OF CROWD) | INCIDENT CLASSIFICATION (ASSAULT) |
|---|---|---|---|---|---|
| DETERMINATION ACCURACY (HIGH) | EVENT A | EVENT C | | EVENT E | EVENT G |
| DETERMINATION ACCURACY (MEDIUM) | EVENT B | EVENT D | | EVENT F | EVENT H |
| ... | | | | | |

SUBJECT TO BE ALERTED DETERMINATION STANDARD

| SUBJECT TO BE ALERTED | EVENT A | EVENT B | EVENT C | EVENT D |
|---|---|---|---|---|
| ON-SITE STAFF | 1 | 1 | 1 | 0 |
| SECURITY GUARD | 1 | 1 | 0 | 0 |
| SURVEILLANCE CENTER | 1 | 0 | 0 | 0 |
| ICHIRO HITACHI | 0 | 0 | 1 | 1 |
| ... | | | | |

SETTING OF SURVEILLANCE IMPORTANCE DETERMINATION STANDARD

| SELECT / INCIDENT CLASSIFICATION | ☐ HAND-OVER OF BAGGAGE | ☐ CLIMB-OVER OF FENCE | ☐ FALLING DOWN | ☐ SCUFFLE | ... |
|---|---|---|---|---|---|
| SURVEILLANCE IMPORTANCE | ▽ MEDIUM | ▽ MEDIUM | ▽ LOW | ▽ HIGH | |

[ADD INCIDENT TO BE DETECTED] ~612    [DELETE SELECTED INCIDENT TO BE DETECTED] ~613

SETTING OF EVENT DETERMINATION STANDARD

| | SURVEILLANCE IMPORTANCE (HIGH) | SURVEILLANCE IMPORTANCE (MEDIUM) | ... | INCIDENT CLASSIFICATION (BREAKUP OF CROWD) | INCIDENT CLASSIFICATION (ASSAULT) | ... |
|---|---|---|---|---|---|---|
| DETERMINATION ACCURACY (HIGH) | ▽ EVENT A | ▽ EVENT C | | ▽ EVENT E | ▽ EVENT G | |
| DETERMINATION ACCURACY (MEDIUM) | ▽ EVENT B | ▽ EVENT D | | ▽ EVENT F | ▽ EVENT H | |
| ⋮ | | | | | | |

SETTING OF SUBJECT TO BE ALERTED DETERMINATION STANDARD

| SELECT | SUBJECT TO BE ALERTED | EVENT A | EVENT B | EVENT C | EVENT D | ... |
|---|---|---|---|---|---|---|
| ☐ | ON-SITE STAFF | ▽ ON | ▽ ON | ▽ ON | ▽ OFF | |
| ☐ | SECURITY GUARD | ▽ ON | ▽ ON | ▽ OFF | ▽ OFF | |
| ☐ | SURVEILLANCE CENTER | ▽ ON | ▽ OFF | ▽ OFF | ▽ OFF | |
| ⋮ | | | | | | |

[ADD SUBJECT TO BE ALERTED] ~632    [DELETE SELECTED SUBJECT TO BE ALERTED] ~633

[SAVE] ~641

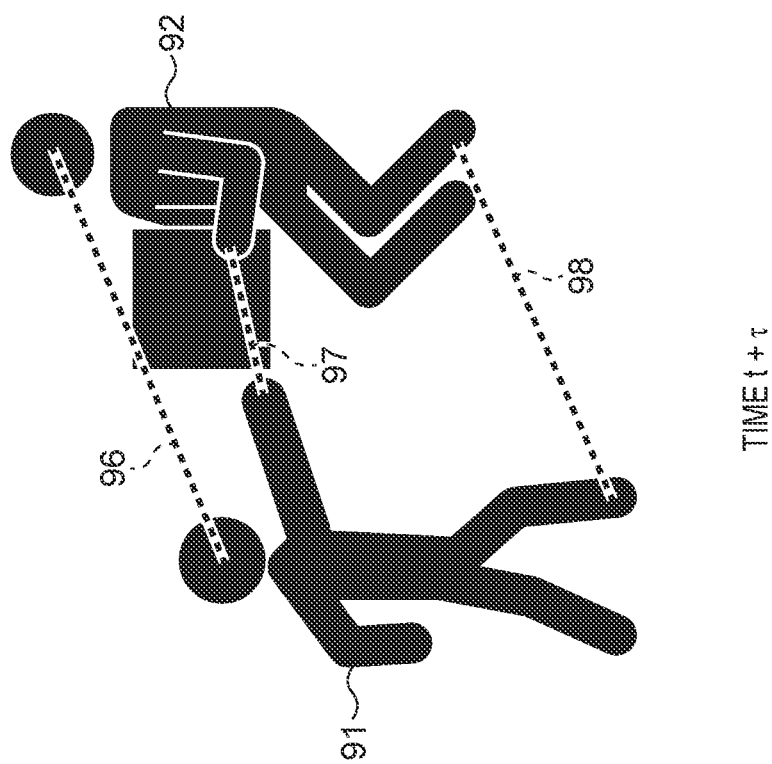
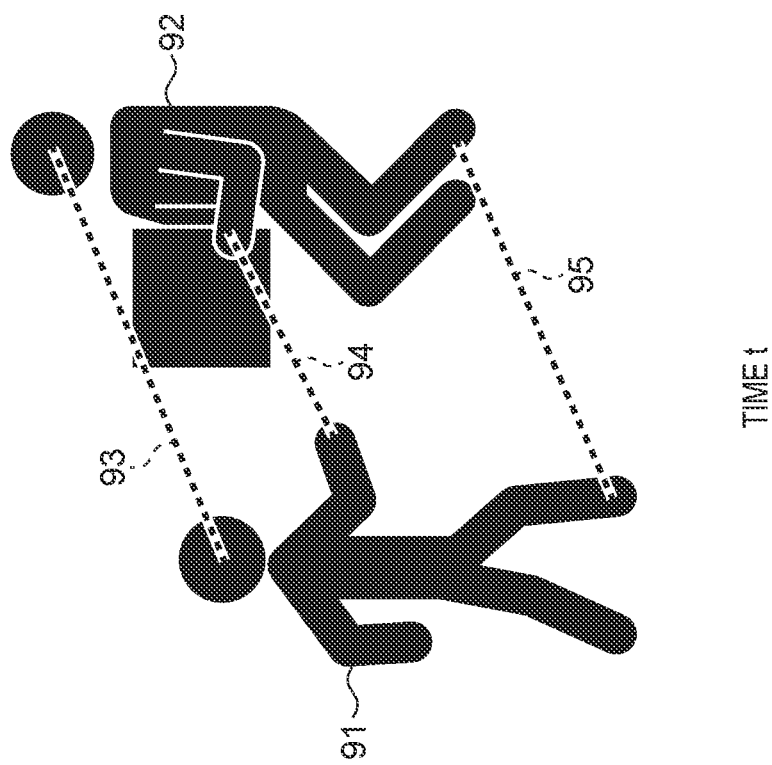

VIDEO SURVEILLANCE SYSTEM AND VIDEO SURVEILLANCE METHOD

CROSS-REFERENCE TO RELATED APPLICATION

The present application claims priority from Japanese application JP 2020-025733, filed on Feb. 18, 2020, the contents of which is hereby incorporated by reference into this application.

TECHNICAL FIELD

The present invention relates to a video surveillance system and a video surveillance method for detecting an incident from a video that captured a surveillance area.

BACKGROUND ART

In recent years, the importance of video surveillance is increasing in event venues such as concert halls and amusement facilities, and public facilities such as train stations and airports. For example, in response to an act of handing over baggage or an act of leaving something behind that is conducted inside or outside a security area, actions such as the surveillance and detection thereof, and approaching the person that conducted, or may conduct, such act are required in terms of security in order to prevent such acts of terrorism employing dangerous objects such as explosives or hazardous liquids. Moreover, as a result of promptly detecting irregular movement of a captured person, such as when the person falls down or hunches over, the facility manager can promptly protect the subject to be rescued within the facility, and this will contribute to the ensurement of safety.

Conventionally, for example, the image surveillance device described in PTL 1 identifies the type of article in a person's possession, detects the act of multiple persons handing over an article, and calculates the site of the hand-over from the images that captured the surveillance area. The importance of surveillance of the detected hand-over act is calculated, and the detection result of the hand-over act is output according to the importance of surveillance. Moreover, PTL 1 describes methods of notifying (outputting) the detection result of the hand-over act to "the surveillance officer of the surveillance center" based on a screen display, an alarm lamp, a warning sound, among other methods.

CITATION LIST

Patent Literature

[PTL 1] Japanese Unexamined Patent Application Publication No. 2017-028561

SUMMARY OF THE INVENTION

Problems to be Solved by the Invention

In PTL 1 described above, the method of notifying the surveillance officer is limited to the display of information (time, place, article name, surveillance importance) and captured images of the act of handing over an article, and subsequent measures are to be taken by the surveillance officer based on his/her judgment. Nevertheless, the incidents to be surveilled within the surveillance area are not limited to the hand-over of baggage as described above, and various other incidents such as a person climbing over a fence or throwing something over a fence must also be surveilled. If all such incidents are notified to the surveillance officer, all unnecessary incidents will also be notified to the surveillance officer, and there is a possibility that the burden on the surveillance officer will increase. Moreover, entrusting the surveillance officer to take measures against the occurred incidents will also lead to the increase of the burden on the surveillance officer. Consequently, this kind of increase of burden will induce oversights of incidents and delays in taking measures, and may deteriorate the effectiveness of surveillance.

Thus, an object of the present invention is to provide a video surveillance system capable of realizing an efficient alert process and improving the effectiveness of surveillance when surveilling various incidents that occur within the surveillance area.

Means to Solve the Problems

The video surveillance system as one mode of the present invention is a video surveillance system for detecting a plurality of incidents in a surveillance area using a video that captured the surveillance area, comprising: a calculation unit which detects an image of a person and/or an object from the video, and calculates an incident feature quantity as a feature quantity representing a status of a detected person and/or a feature quantity of a detected object; and a determination unit which detects an occurrence of an incident based on the incident feature quantity, and determines subjects to be alerted of an occurred incident, which is a detected incident, from a type of the occurred incident and a determination accuracy of the occurred incident.

Moreover, the present invention additionally provides a video surveillance method for detecting a plurality of incidents in a surveillance area using a video that captured the surveillance area, comprising: a calculation step which detects an image of a person and/or an object from the video, and calculates an incident feature quantity as a feature quantity representing a status of a detected person and/or a feature quantity of a detected object; a detection step which detects an occurrence of the incident based on the incident feature quantity; and a determination step which determines subjects to be alerted of an occurred incident, which is a detected incident, from a type of the occurred incident and a determination accuracy of the occurred incident.

Advantageous Effects of the Invention

According to the present invention, it is possible to realize an efficient alert process and improve the effectiveness of surveillance when surveilling various incidents that occur within the surveillance area.

BRIEF DESCRIPTION OF DRAWINGS

FIGS. 6A to 6C are diagrams showing a setting example of the surveillance standard information in this embodiment.

FIG. 7 is a diagram showing a setting screen example of the surveillance standard information in this embodiment.

FIGS. 11A and 11B are diagrams showing the relative distance relationship of each body part between the persons.

DESCRIPTION OF EMBODIMENTS

An embodiment of the video surveillance system according to the present invention is now explained. This embodiment attempts to promptly detect an act of handing over baggage or an act of leaving something behind that is conducted inside or outside the security area for the purpose of anti-terrorism in public facilities such as event venues, train stations and airports, and an irregular movement of a captured person, such as when the person falls down or hunches over, for the purpose of ensuring the safety of the facility users. In order to reduce the burden on the surveillance officer of the surveillance center in dealing with such incidents, this embodiment promotes the performance of efficient security operations by determining the subjects to be alerted according to the incident of the detection result, the determination accuracy thereof, and the preset surveillance standard information, and notifying those subjects to be alerted. This embodiment is now explained with reference to the appended drawings.

Note that the term "incident" as used in this embodiment refers to a person's predetermined action, a predetermined object or any other item to be detected in the surveillance area. For example, as the person's actions, actions that may be an illegal conduct or a dangerous act such as handing over baggage, climbing over a fence, leaving something behind, or fighting between people, or actions that may require assistance such as a person falling down or hunching over, may be listed as a person's predetermined action. In the case of an object, baggage such as a suitcase or a backpack left behind, a dangerous object such as a drum can or a knife, or a predetermined object such as a lost article may be considered. While the person's predetermined action or predetermined object described above may change according to the place of the surveillance area such as an airport, an event venue, or an amusement facility, the term "incident" as used in this embodiment includes all targets to be detected in the surveillance area.

Moreover, the term "determination accuracy" refers to the numerical value which indicates the level of the certainty factor in which the incident was determined using deep learning or machine learning described later, and is represented as a probability or a continuous value of an arbitrary number of classes.

Moreover, the term "video" as used in this embodiment is an image of the result captured with an imaging device such as a camera, and includes still images and moving images. Moreover, a video may also be a set of a plurality of still images captured along a time series.

First Embodiment

Figure 1:
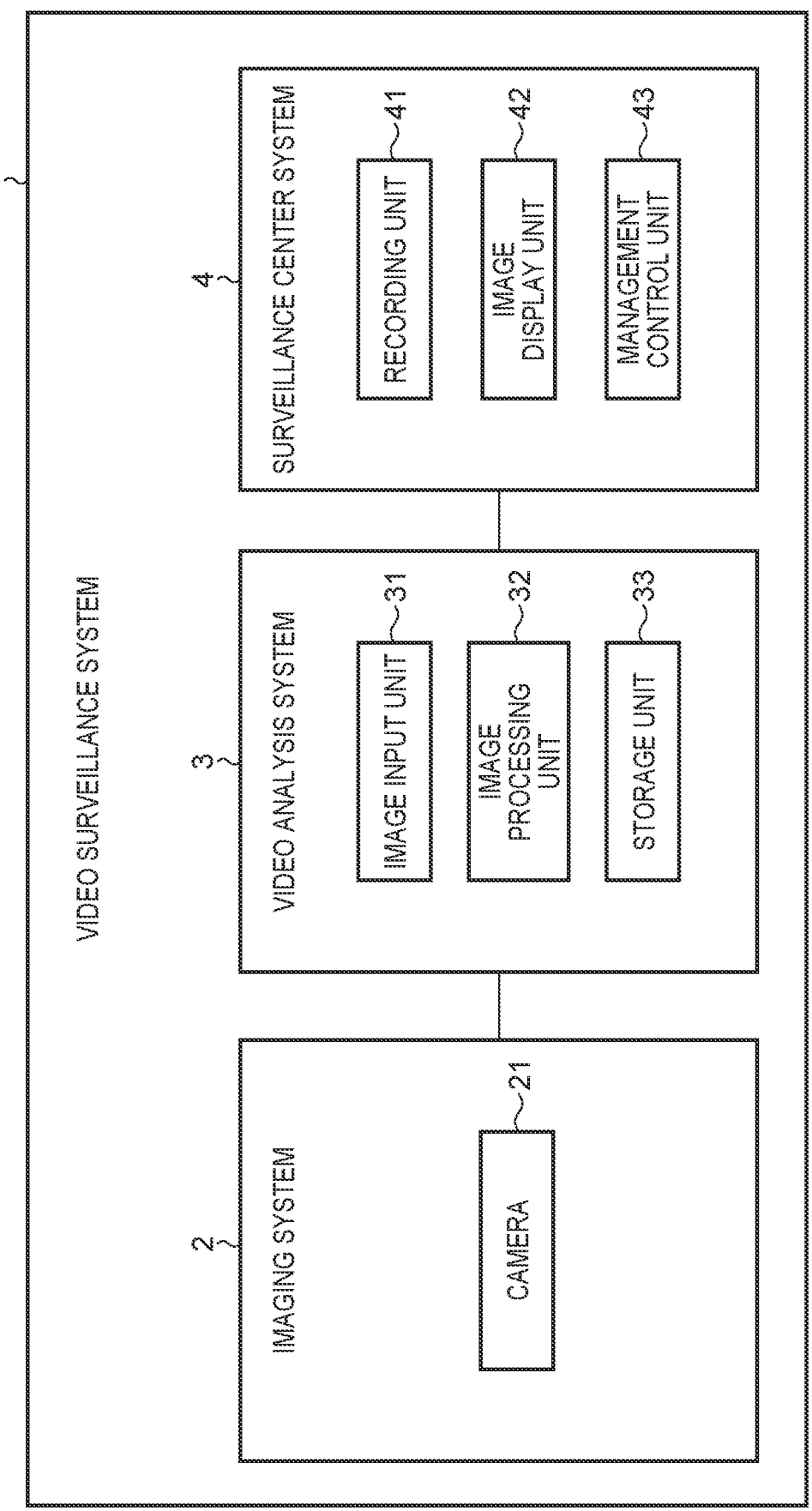
FIG. 1 is a diagram showing the overall configuration of the video surveillance system in this embodiment.

FIG. 1 is a diagram showing the overall configuration of the video surveillance solution which utilizes the video surveillance system in this embodiment. As shown in FIG. 1, a video surveillance system 1 is configured from an imaging system 2 installed in a surveillance target area, a video analysis system 3 which analyzes the input video from the imaging system 2 and detects an incident from a person's action or the type and other information of a captured object, and thereby determines the subjects to be alerted, and a surveillance center system 4 which receives the analysis result from the video analysis system 3. The imaging system 2, the video analysis system 3, and the surveillance center system 4 are now explained in detail.

The imaging system 2 includes one or more cameras 21 installed in the surveillance target area, and the captured video is sequentially input to an image input unit 31 of the video analysis system 3. The camera 21 is a surveillance camera disposed so as to capture the entire area to be surveilled. Note that, when an area does not need to be set, the surveillance camera may also be a mobile camera that is not fixed, and may be of any format so as long as it can capture the surveillance target area. Meanwhile, when an area needs to be set, a surveillance camera fixed to a wall or a pillar is used, and it is desirable that the calibration setting of the camera is performed in advance. Moreover, in the foregoing case, while it is anticipated that a fixed camera unable to perform a Pan-Tilt-Zoom (PTZ) operation will be used, when the combination of the foregoing settings and the calibration setting has been adjusted in advance, a camera capable of performing a PTZ operation may also be used, and the same camera may also be used to surveil various areas.

Moreover, the camera 21 and the image input unit 31 are connected via a wired communication means or a wireless communication means, and color images are continuously transmitted from the camera 21 to the image input unit 31 at a rate of approximately 5 fps. If the processing performed by the image processing unit 32 and the image display unit 42 described later falls within the foregoing designated frame rate, the camera 21 and the video analysis system 3 do not need to be of a one-to-one correspondence, and a plurality of cameras and one video analysis system may also be used. Note that the camera 21 may also be mounted on the video analysis system described later, and perform a part or all of the processing explained in this embodiment.

The video analysis system 3 includes an image input unit 31, an image processing unit 32, and a storage unit 33. The image input unit 31 receives the image input from the camera 21, and sends the received image input to the image processing unit 32. Note that the video to be analyzed does not need to be the video that is directly input from the camera 21, and may also be the video that has been separately recorded/saved in a recorder. The image processing unit 32 has a function of determining the subjects to be alerted by reading preset information stored in the storage unit 33 described later, and analyzing the input image. The storage unit 33 stores information such as the surveillance standard set in the management control unit 43 described later, and uses such information for the determination of the subjects to be alerted to become the output of the image processing unit 32. Moreover, in this embodiment, the video analysis system 3 is not limited to an on-premises system in which the server is built within the operational facility, and the server may also be built outside the facility by using a cloud service or the like.

The surveillance center system 4 includes a recording unit 41, an image display unit 42, and a management control unit 43. The recording unit 41 has a function of retaining, as a database, information such as the detected incident obtained with the image processing unit 32 and the determination accuracy thereof, site of occurrence, event, and subjects to be alerted.

Note that the term "event" as used in this embodiment is calculated from the following two factors; namely, the detected incident classification or the "surveillance importance" preset by the manager from the incident classification, and the determination accuracy, and indicates the classification that is used for determining the subjects to be alerted. An event is calculated as a result of presetting the foregoing pair and result. To put it differently, an event is a combination pattern of the subjects to be alerted, and is identified based on the classification of the detected incident (occurred incident), and the determination accuracy which is the certainty of occurrence. Moreover, while the "subjects to be alerted" in this embodiment are illustrated below for each job category of persons engaged in surveillance operations such as on-site staff, security guard, surveillance center, and police, the subjects to be alerted may also be individuals such as specific on-site staff members or specific security guards.

The image display unit 42 displays, on a screen, information such as a list of information stored in the database, an overall imaging frame of the detected incident that was selected, an image obtained by superimposing a detection frame of the detected part on the foregoing image, or an enlarged image of the detected part. The management control unit 43 has a function which allows the surveillance subject to input setting information in the storage unit 33 in order to store setting information such as the surveillance standard to be used by the image processing unit 32.

Figure 2:
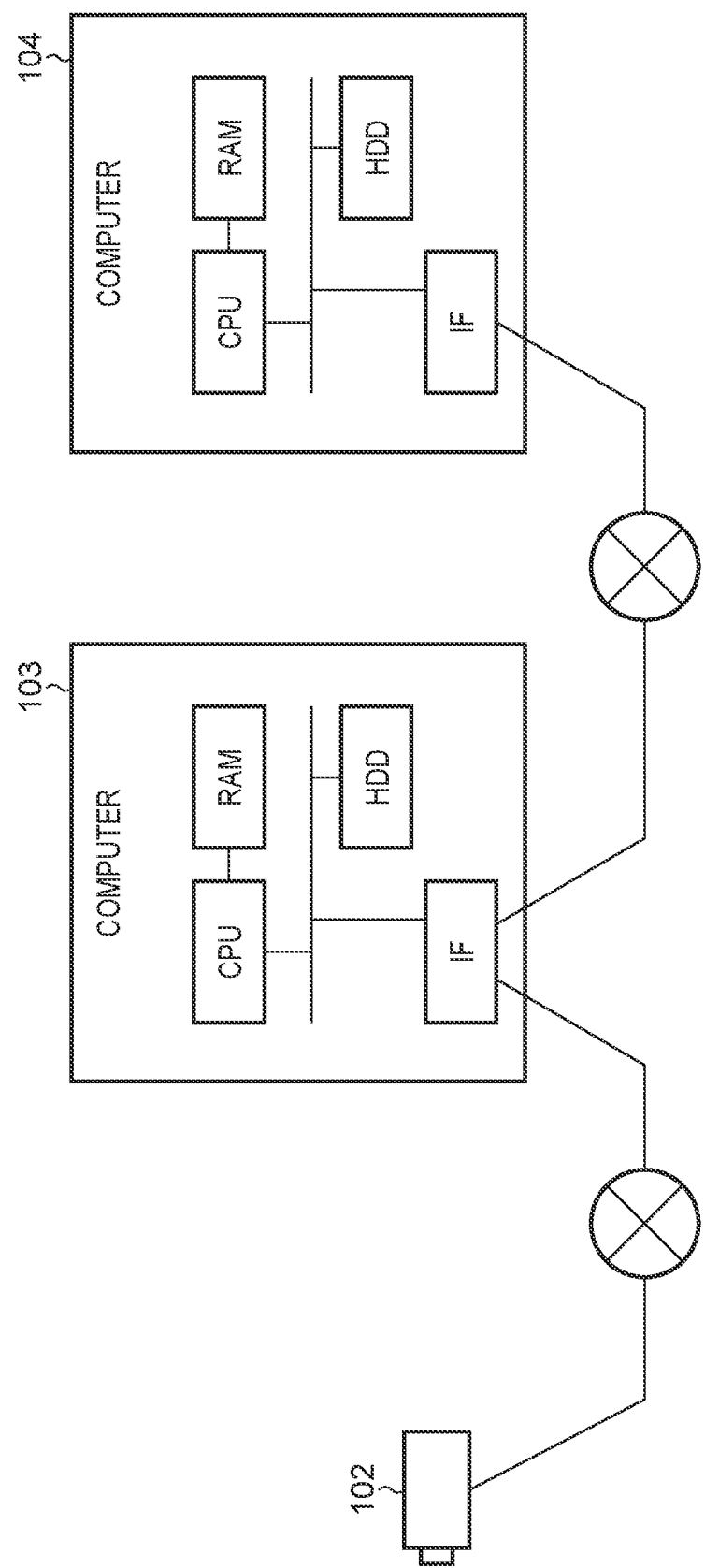
FIG. 2 is a hardware configuration diagram of the video surveillance system in this embodiment.

FIG. 2 is a hardware configuration diagram of the video surveillance system in this embodiment. In FIG. 2, a camera unit 102 is connected to a computer 103 via a network. Furthermore, the computer 103 is communicable with a computer 104 via a network.

One or more camera units 102 are installed in the surveillance area, and send video data to the computer 103 as needed. The computer 103 comprises a CPU (Central Processing Unit) as an arithmetic control unit, a RAM (Random Access Memory) as a main storage device, and an HDD (Hard Disk Drive) as an auxiliary storage device. The computer 103 realizes the functions as the video analysis system 3 by reading various programs from the HDD and loading them into the RAM, and executing the programs with the CPU. Moreover, the computer 103 communicates with the camera unit 102 and the computer 104 via a predetermined communication interface (IF). Note that, while not shown in FIG. 2, I/O devices such as a keyboard and a display are also connected to the computer 103 via a predetermined IF.

The computer 104 comprises a CPU as an arithmetic control unit, a RAM as a main storage device, and an HDD as an auxiliary storage device, and realizes the functions as the surveillance center system 4 by reading various programs from the HDD and loading them into the RAM, and executing the programs with the CPU. Moreover, the computer 104 is connected to the computer 103 and I/O devices such as a keyboard and a display via a predetermined interface (IF).

Figure 3:
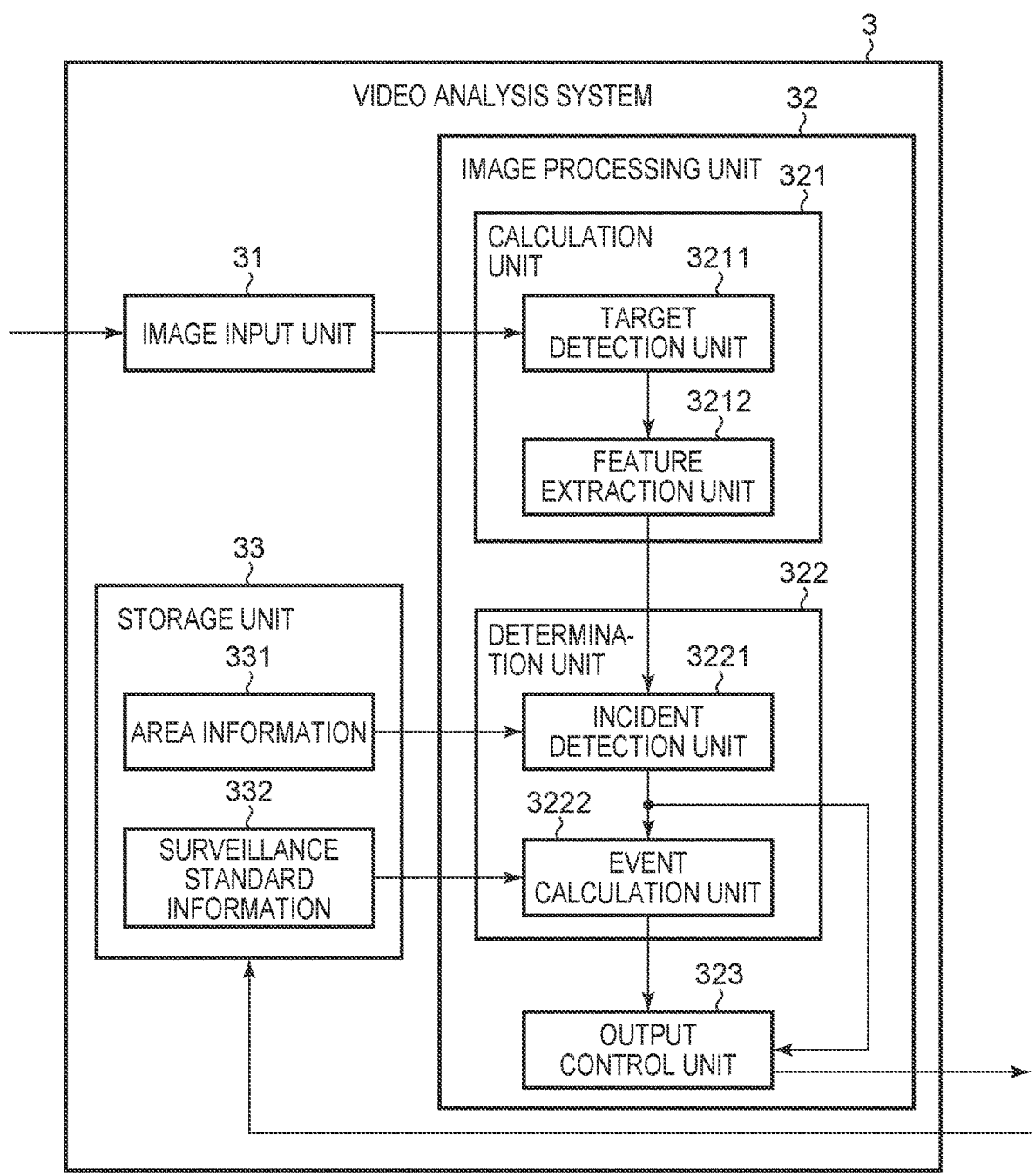
FIG. 3 is a diagram showing the block diagram of the video analysis system in this embodiment.

Details of the video analysis system 3 are now explained with reference to FIG. 3. FIG. 3 is a diagram showing the block diagram of the video analysis system in this embodiment. The image input unit 31, the image processing unit 32, and the storage unit 33 as the constituent elements of the video analysis system 3 are now explained in detail. The image processing unit 32 additionally includes a calculation unit 321, a determination unit 322, and an output control unit 323.

In this embodiment, the imaging system 2 configured from one or more cameras 21 sequentially inputs still images to the image input unit 31. However, when the incident detection unit 3221 described later uses an incident detection means which handles time series information, the input may also be moving images.

The calculation unit 321 includes a target detection unit 3211 and a feature extraction unit 3212. The images received by the image input unit 31 are input to the target detection unit 3211. The target detection unit estimates, from the input images, information related to the position of the target object on the image required for detecting an incident, such as the coordinate position of the captured person or object on the image of a rectangular area, or the coordinate position of a person's skeletal frame. Simultaneously, the target detection unit 3211 determines the area where the estimated person or object is positioned. Area determination is used for performing the mask processing of input images in order to reduce misdetection or improve the image processing speed by designating an area outside the security area when the incident detection unit 3221 described later is to detect the act of handing over baggage or setting a partial area of the overall captured image as the surveillance target. Each area determination is performed based on information related to the position of the estimated target object on the image.

Next, the feature extraction unit 3212 extracts the incident feature quantity to be input to the detection model in the determination unit 322 from the image area of the person or object estimated in the target detection unit 3211. As an image-based feature quantity, used may be a color histogram, HOG (Histograms of Oriented Gradients), SIFT (Scale-Invariant Feature Transform), or a general image feature quantity such as a vector output from an intermediate layer of a network of a learned deep learning model. Moreover, as a feature quantity which represents a posture of a person from his/her skeletal frame, used may be a coordinate set in which, as one point among the articulation nodes indicating the skeletal frame as a reference, coordinates of other articulation nodes are converted into relative coordinates relative to the reference point. Otherwise, an aggregate of norms or angles obtained by performing polar conversion may also be used as the feature quantity. When the input is a video, preferably, a tracking means of a moving object as represented by a Kalman filter is separately prepared, and the feature quantity calculated from the amount of movement of the respective estimated coordinates of the skeletal frame is used. These feature quantities may be individually used in the learning or identification by the determination unit 322 in the subsequent stage, or may be used in combination based on vector coupling, feature conversion or feature selection.

The determination unit 322 is configured from an incident detection unit 3221 and an event calculation unit 3222. The incident detection unit 3221 obtains an incident and the site of occurrence thereof, as well as the determination accuracy thereof, by using the camera ID of the camera which captured the image that was analyzed, the feature quantity of the person or object obtained with the calculation unit, the area where such person or object is positioned, and the area information 331 set and stored by the management control unit 43. When obtaining the foregoing information, the use of an AI model such as deep learning or machine learning based on an SVM (Support Vector Machine) or a decision tree is anticipated, but an incident detection method pursuant to a rule-based algorithm may also be adopted. For example, when it is determined that hands are approaching from the respective areas in a manner of moving across the inside and outside of the security area, it can be determined that an act of handing over baggage has occurred. Moreover, deep learning in which the detected target image is the input, and the incident is the output, may also be used. In the foregoing case, since the feature extraction and the incident detection will be processed with the same network, the feature extraction unit and the incident detection unit may be deemed to be the same processing unit.

The obtained detected incident and the determination accuracy thereof are input to the event calculation unit 3222, an event is determined based on the surveillance standard information 332 set and stored by the management control unit 43, and the subjects to be alerted are determined. Details of the event calculation unit 3222 will be explained later with reference to FIG. 4. Finally, the occurred incident, the site of occurrence, the determination accuracy, the event, and the subjects to be alerted are sent by the output control unit 323 to the recording unit 41 of the surveillance center system 4.

Figure 4:
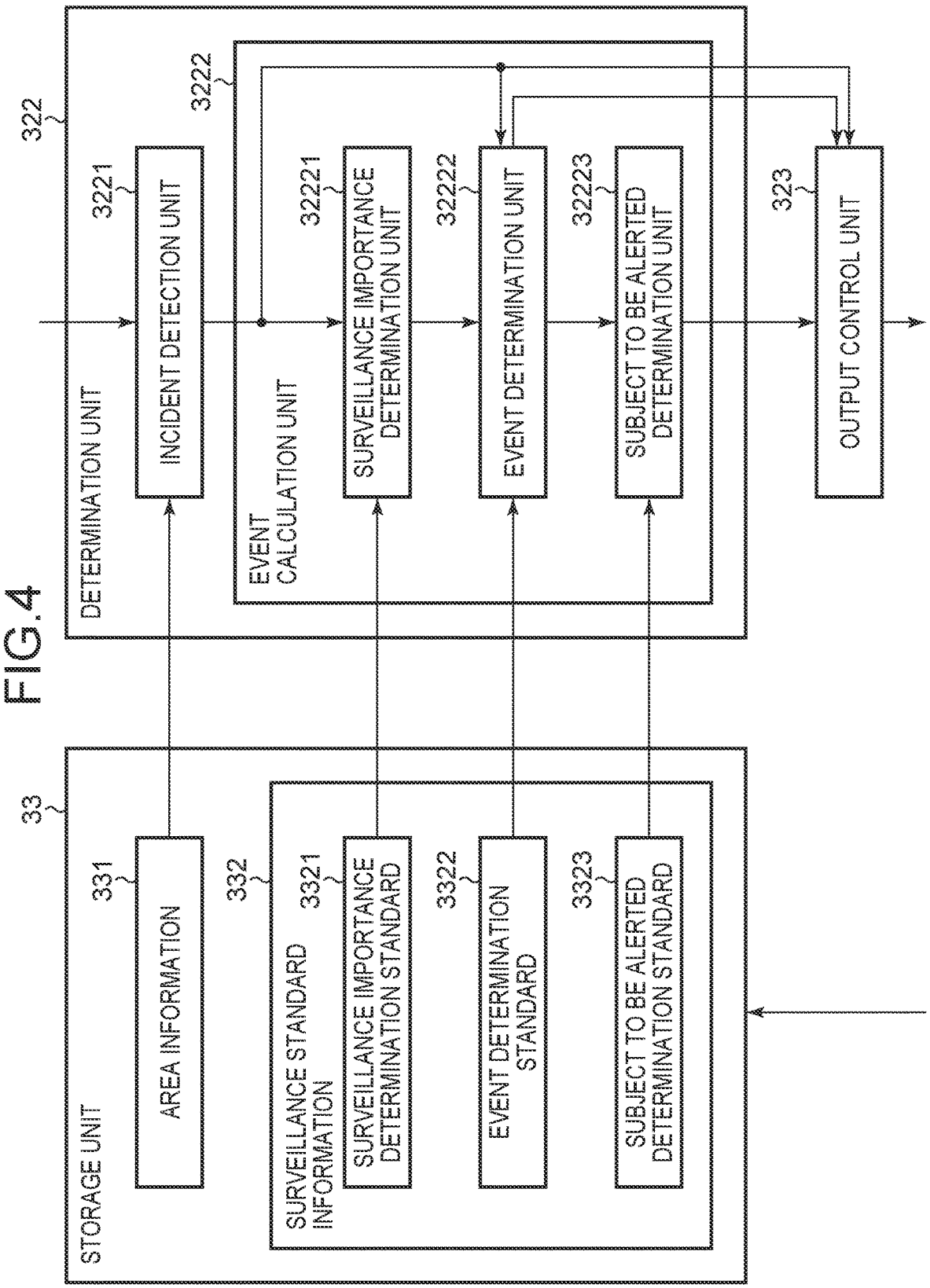
FIG. 4 is a diagram showing the block diagram of the storage unit and the determination unit of the video analysis system in this embodiment.

Details of the surveillance information standard 332 and the event calculation unit 3222 are now explained with reference to FIG. 4. FIG. 4 is a diagram showing the block diagram of the storage unit and the determination unit of the video analysis system in this embodiment. The surveillance information standard 332 includes a surveillance importance determination standard 3321, an event determination standard 3322, and a subject to be alerted determination standard 3323. Moreover, the event calculation unit 3222 includes a surveillance importance determination unit 32221, an event determination unit 32222, and a subject to be alerted determination unit 32223.

The surveillance importance determination unit 32221 receives the detected incident from the incident detection unit 3221. Here, the surveillance importance of each occurred incident is determined based on the surveillance importance determination standard 3321. The surveillance importance determination standard 3321 is set by the manager for each incident.

The event determination unit 32222, with the occurred incident or the surveillance importance of the incident determined by the surveillance importance determination unit 32221, and the determination accuracy of the incident as the output of the incident detection unit 3221, as the inputs, determines the event based on the event determination standard 3322 set and stored in the surveillance standard information 332. The event determination standard is set by the manager for each combination of the surveillance importance and the determination accuracy, or for each combination of the incident classification and the determination accuracy.

The subject to be alerted determination unit 32223, with the event determined by the event determination unit 32222 as the input, determines the subjects to be alerted for each event based on the subject to be alerted determination standard 3323 set and stored in the surveillance standard information 332. The subject to be alerted determination standard 3323 is set by the manager for each event.

Figure 5:
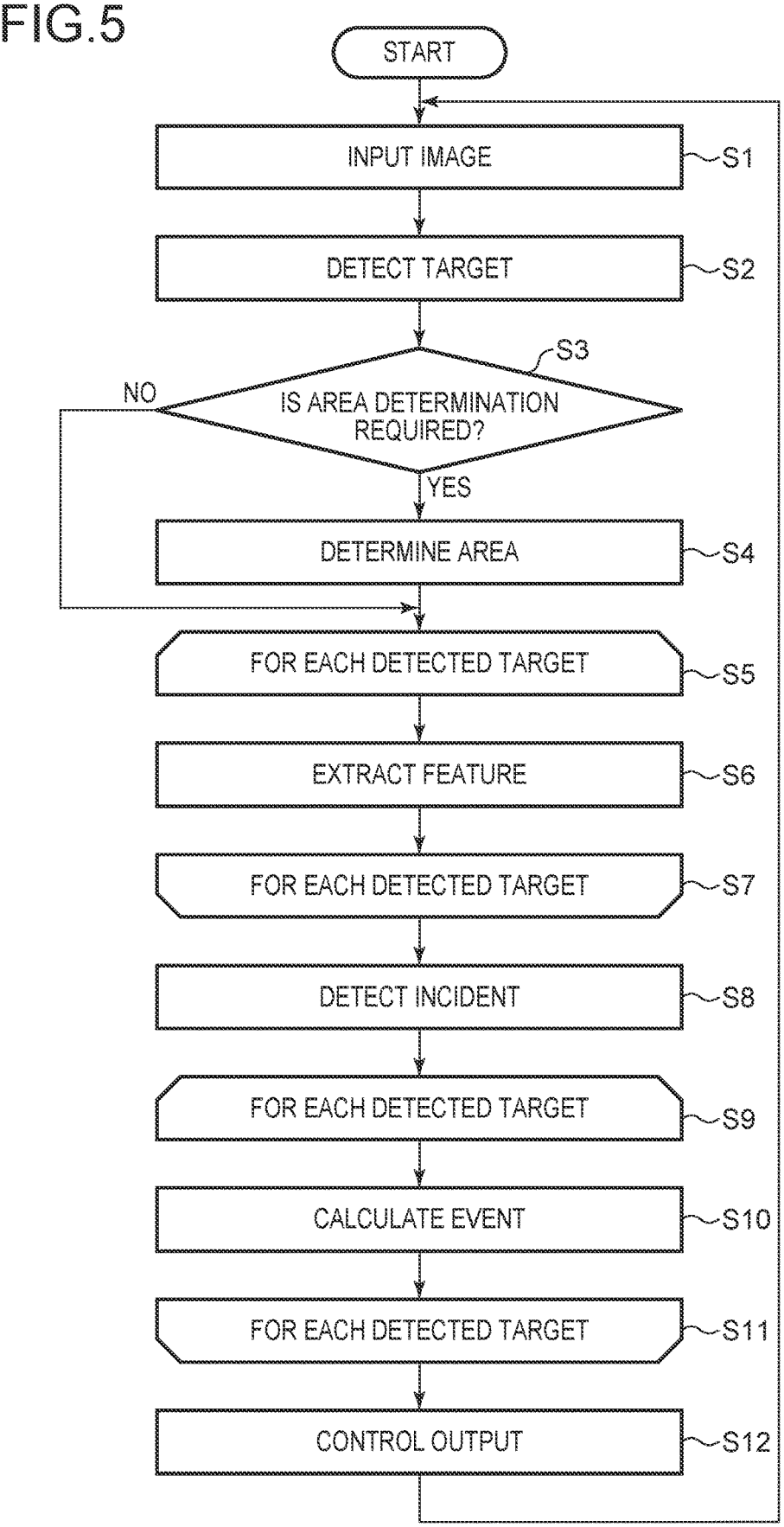
FIG. 5 is a diagram showing the flowchart of the video analysis system in this embodiment.

The processing performed by the video analysis system is now explained with reference to FIG. 5. FIG. 5 is a diagram showing the flowchart of the video analysis system in this embodiment.

In FIG. 5, the images captured with one or more cameras 21 are sequentially sent to the image input unit 31 (S1). However, when the incident detection unit 3221 uses an incident detection means which handles time series information, the input may also be moving images.

The images received by the image input unit 31 are input to the target detection unit 3211, and the target area required for detecting an incident, such as the coordinate position of the captured person or object on the image of a rectangular area, or the coordinate position of a person's skeletal frame, is estimated from the input images (S2).

The target detection unit 3211 determines the area where the estimated person or object is positioned (S3). Area determination is used for performing the mask processing of input images in order to reduce misdetection or improve the image processing speed by designating an area outside the security area when the incident detection unit 3221 described later is to detect the act of handing over baggage or setting a partial area of the overall captured image as the surveillance target. Accordingly, when the manager does not need to detect a hand-over act or the like within the facility or perform the mask processing for the purposes described above, the processing proceeds to step S5. When area determination is to be performed, the processing proceeds to step S4, and the area is determined based on information related to the position of the target object on the image.

The feature extraction unit 3212 extracts the incident feature quantity to be input to the detection model in the determination unit 322 until the the processing of all detection targets is completed with regard to the image areas of the person or object estimated by the target detection unit (S5 to S7).

The incident detection unit 3221 obtains an incident and the site of occurrence thereof, as well as the determination accuracy thereof, by using the feature quantity of the person or object obtained with the calculation unit 321, the area where such person or object is positioned, and the area information 331 set and stored by the management control unit 43 (S8).

The obtained detected incident and the determination accuracy thereof are input to the event calculation unit 3222 until the processing of all detected incidents is completed, the surveillance importance is determined based on the surveillance standard information 332 set and stored by the management control unit 43, the event is determined, and the subjects to be alerted are determined (S9 to S11).

Finally, the occurred incident, the site of occurrence, the determination accuracy, the event, and the subjects to be alerted are sent by the output control unit 323 to the recording unit 41 of the surveillance center system 4 (S12). When the foregoing processing is completed, the processing returns to step S1, and the next image is acquired.

Note that the processing of the flow shown in FIG. 5 does not necessarily have to be performed based on a single process, and may also be performed asynchronously using a plurality of processes in order to improve the computational efficiency.

A setting example of the surveillance standard information 332 is now explained with reference to FIGS. 6A to 6C. FIGS. 6A to 6C are diagrams showing a setting example of the surveillance standard information in this embodiment, and includes the following three tables; namely, FIG. 6A: surveillance importance determination standard, FIG. 6B: event determination standard, and FIG. 6C: subject to be alerted determination standard. These are tables that can be respectively set by the manager, and may be set from the setting screen example of FIG. 7 described later.

Foremost, in FIG. 6A, according to the surveillance importance determination standard, the surveillance importance is set in the incident classification. By referring to this setting, the surveillance importance determination unit 32221 determines the surveillance importance of each occurred incident from the detected incident and the determination accuracy. For example, in an area 51, for the incident classification of "hand-over of baggage", the surveillance importance is set to "medium", and for the incident classification of "scuffle", the surveillance importance is set to "high".

Next, in FIG. 6B, according to the event determination standard, the event determination unit 32222 determines the event based on the incident classification or the surveillance importance of the occurred incident determined by the surveillance importance determination unit 32221, and the determination accuracy of the incident. For example, when the incident classification of "climb-over of fence", in which the surveillance importance is "medium" in the area 51, occurs at a determination accuracy (high), the event is determined to be "event C" from an area 52. The event may also be determined from the determination accuracy of an occurred incident without converting that incident into the surveillance importance. For example, when the incident of "breakup of crowd" occurs at a determination accuracy (medium), the event is determined to be "event E" from the area 52. Similarly, when the incident of "assault" occurs at a determination accuracy (high), the event is determined to be "event G".

Next, in FIG. 6C, according to the subject to be alerted determination standard, the subjects to be alerted are determined based on the event. In an area 53, "1" indicates that the corresponding item is a subject to be alerted, and "0" indicates that the corresponding item is not a subject to be alerted. By referring to this setting, the subject to be alerted determination unit 32223 determines the subjects to be alerted for each event from the event determined by the event determination unit 32222. For example, for the event determined to be "event B" in the area 52, the subjects to be alerted are determined to be the "on-site staff" and the "security guard" from the area 53.

Note that the level of surveillance importance in the surveillance importance determination standard may also be set arbitrarily. Moreover, the indications of event A and event B in the event determination standard and the indications of 1 and 0 in the subject to be alerted determination standard may also be different corresponding expressions.

As described above, by setting the surveillance importance upon differentiating the level thereof for each incident classification and determining the event in accordance with the level of the determination accuracy, the importance of the incident to be surveilled and subjects to be alerted for dealing with that incident can be selected more flexibly. For example, the setting can suit the respective users, such as a user that wishes to alert a security guard for an incident with a high surveillance importance even if the determination accuracy is low, or a user that wishes to alert an on-site staff for an incident with a high determination accuracy, irrespective of the surveillance importance of the incident, in order to cause an on-site staff to confirm the situation at the site of occurrence. Since this will lead to the reduction of alerts to the surveillance officer for incidents in which an alert is not required inherently, the burden on the surveillance officer can be reduced. Otherwise, by directly notifying an on-site staff or a security guard of an incident having high surveillance importance until the surveillance officer of the surveillance center makes one's decision regarding the incident, or in cases where the surveillance officer is unable to promptly deal with the incident, the responsiveness to the incident can be improved.

Furthermore, by designating and notifying an individual such as an on-site staff or a security guard near the site of occurrence, it will be possible to avoid a bystander effect. Moreover, in event venues such as concert halls and amusement facilities and public facilities such as train stations and airports, due to the size of their floor area, a notification to all subjects to be alerted who are registered as on-site staff may become a wasteful alert. Thus, the designation of an individual (or individuals) is effective for performing efficient video surveillance while maintaining high responsiveness. The foregoing designation can be realized by identifying an individual using a means such as the GPS of the terminal owned by the on-site staff or the like near the site of occurrence of the incident, and alerting that on-site staff.

The GUI (Graphical User Interface) for setting the surveillance standard information of FIGS. 6A to 6C are now explained with reference to FIG. 7. FIG. 7 is a diagram showing a setting screen example of the surveillance standard information in this embodiment. The setting screen example of FIG. 7 is configured from an area 61 used for setting the surveillance importance determination standard 3321, an area 62 used for setting the event determination standard 3322, and an area 63 used for setting the subject to be alerted determination standard 3323.

In the setting screen example of the surveillance importance determination standard 3321 shown in area 61, the surveillance importance of the incident selected by the manager in area 611 can be selected from a pull-down list. Specifically, the pull-down list of the surveillance importance, which has been defined in advance, can be displayed by pressing the inverted triangle symbol of each incident, and the manager sets the intended surveillance importance from the displayed list. While the surveillance importance is provided in the three levels of "high", "medium", and "low" as shown in the area 51, without limitation thereto, the configuration may also be such that an arbitrary number of classes is set by the manager on another setting screen. Moreover, the intended incident to be detected can be added by pressing the "Add incident to be detected" button as shown in an area 612. Meanwhile, the selected incident to be detected can be deleted by pressing the selection column of each incident of an area 611 and selecting the incident, and pressing the "Delete selected incident to be detected" button as shown in an area 613. Ideally, the manager can easily select the incident that he/she wishes to discover in the manner described above.

The setting screen example of the event determination standard 3322 shown in the area 62 is a matrix diagram in which the surveillance importance and the incident classification are indicated in the line direction, and the determination accuracy is indicated in the column direction, and the manager can select the event of the respective elements from a pull-down list. Specifically, the pull-down list of the events can be displayed by pressing the inverted triangle symbol of each incident, and the manager sets the intended event from the displayed list. The number of events can be set without any limitation. Moreover, the number of elements in the column direction of the matrix diagram is equal to the sum of the number of classes of the surveillance importance and the number of registered incident classifications. Similarly, the number of elements in the line direction of the matrix diagram is equal to the number of classes of the determination accuracy, and may also be set by the manager on another setting screen. However, if the incident to be registered in the area 62 has already been set in the surveillance importance determination standard 3321, since a redundancy of standards of the event determination will arise, it is necessary to implement error processing so that an incident, for which the surveillance importance has previously been set, cannot be set in the area 62 in order to prevent the foregoing redundancy.

The setting screen example of the subject to be alerted determination standard 3323 shown in the area 63 is a matrix diagram in which the events are indicated in the line direction, and the subjects to be alerted are indicated in the column direction, and is used for setting the subjects to be alerted corresponding to each of the events set in the setting screen of the event determination standard 3322. The number of lines shown in the area 631 is equal to the number of events set in the setting screen of the event determination standard 3322. The subject candidates to be alerted are managed on another setting screen. An intended subject to be alerted can be added by pressing the "Add subject to be alerted" button shown in an area 632. Meanwhile, the selected subject to be alerted can be deleted by pressing the selection column of far left column of the table of the area 63 and selecting the subject to be alerted, and pressing the "Delete selected subject to be alerted" button shown in an area 633. The manager can select the alert target flag of the respective elements from a pull-down list. Specifically, a pull-down list of the flags "ON" and "OFF" can be displayed by pressing the inverted triangle symbol of each incident, and the manager sets the intended flag by choosing one of the two displayed candidates.

When the setting of the area 61, the area 62, and the area 63 is completed, the manager saves the setting by pressing the "Save" button shown in an area 641, and thereby reflects the respective settings in the surveillance standard information of the area 51, the area 52, and the area 53.

Figure 8:
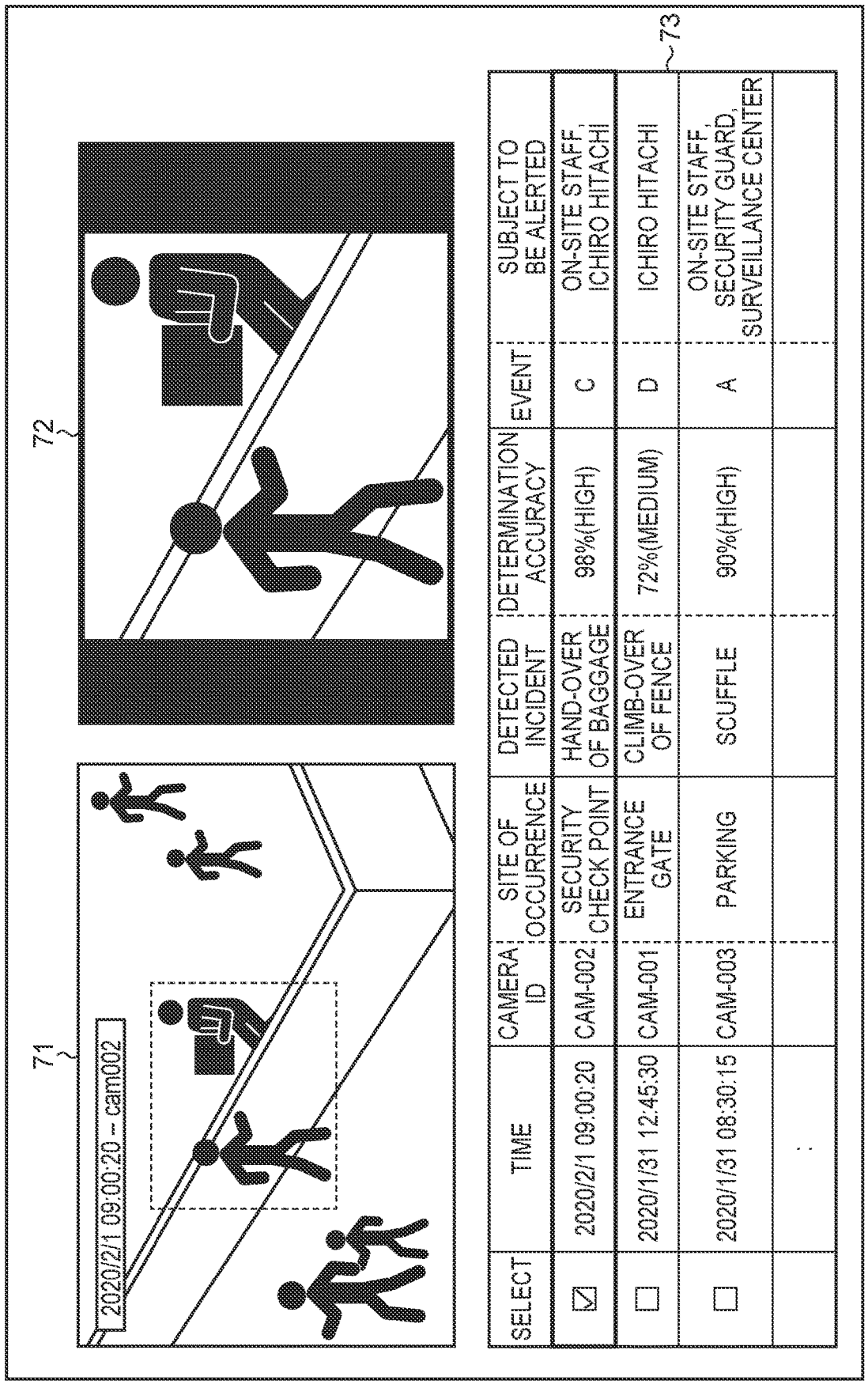
FIG. 8 is a diagram showing a display example of the image display unit in this embodiment.

A notification screen example of the detected incident to be notified to the subjects to be alerted is now explained with reference to FIG. 8. FIG. 8 is a diagram showing a display example of the image display unit in this embodiment. Foremost, the output control unit 323 sends the occurred incident, the site of occurrence, the determination accuracy, the event, and the subjects to be alerted to the recording unit 41 of the surveillance center system 4, and the recording unit 41 retains, as a database, the information that has been sent up to the current time. Next, the image display unit 42 displays, on a screen, information such as the list of information stored in the database as well as the overall imaging frame of the selected detected incident and the enlarged image of the detected part as shown in the example of FIG. 8.

In an area 73, time of occurrence of the incident, camera ID, site of occurrence, detected incident, determination accuracy, determined event and subjects to be alerted are displayed at the lower part of the screen as an occurred incident list up to the current time. The user of this screen can display an overall imaging frame of the detected incident in an area 71, and display an enlarged image of the detected part in an area 72, by pressing the selection column on the far left column of the list and selecting the intended incident.

Here, details of the latest detected incident are displayed in the top line of the table in the area 73, past incidents are display in order in the lower lines, and in this display example the detected incident of the latest time is currently being selected. When the user wishes to refer to a past detection result, the area 73 may be configured so that it can be scrolled, or a search bar may be separately prepared which will enable the search based on date and time, camera ID, site of occurrence, detected incident, determination accuracy, determined event or subjects to be alerted. In order to display the camera ID and the site of occurrence, a database which links information such as the IP address of the camera that acquired the video, the camera ID and the site of occurrence is separately prepared at the time of registering information in the recording unit 41, and such information is acquired by referring to the database.

The area 71 displays the overall imaging frame at the time of detecting the incident, and in this embodiment the position in which the act of handing over baggage is assumed to have occurred is enclosed with a rectangle shown with a dotted line. Meanwhile, the area 72 displays an enlarged image of the dotted line rectangle detected in the area 71. As a result of displaying the overall image and the enlarged image of the detected position side by side in the manner described above, in this embodiment, it is possible to confirm the ambient environment, the specific place of the captured area, the type of person that conducted a hand-over act, and the type of object that was handed over. The specific position of where the incident occurred at which part of the captured area may also be automatically calculated, without requiring the visual confirmation by the surveillance officer of the area 71 and the area 72, by separately creating a database at the time of performing the calibration setting of the camera, and comparing it with the detected incident. In order to achieve the above, a display example of the specific position may be inserted into the area 73 in addition to the camera ID and the site of occurrence.

Moreover, persons who can confirm this screen are not limited to a subject to be alerted, such as the surveillance officer of the surveillance center, who will likely be using a large display, and on-site staff members and security guards can also confirm a part or all of the screen shown in FIG. 8 at the site of occurrence by using a smartphone terminal, a tablet terminal, an AR goggle or the like.

Moreover, when a plurality of incidents are detected from the same frame, a table representing the alert importance of each event may be separately prepared, and the event with high alert importance may be preferentially notified according to that table.

Moreover, in cases where an on-site staff or a security guard is to head to the site of occurrence of the incident, there is a possibility that the person who caused the incident has already left the site of occurrence by the time that the on-site staff or the security guard arrives. In the foregoing case, preferably, a tracking means of a moving object as represented by a Kalman filter is separately prepared and used to track the person who caused the incident. Accordingly, as a different display mode of FIG. 8, the person who caused the incident and is being tracked and the position of that person may also be displayed in real-time.

Moreover, if another incident occurs while a subject to be alerted is dealing with an alerted incident, processing of comparing the importance of the event between the occurred incidents and giving preference to the incident that occurred first when they are of the same importance may be performed, and measures may be taken by notifying the subjects to be alerted once again based on the result thereof Second Embodiment Another embodiment in the image processing unit 32 of the present invention is now explained. In the first embodiment, explained was a case of determining the subjects to be alerted according to the type of the detected incident, the determination accuracy of the detection, and the event determined from the preset surveillance standard information. Here, with regard to the type of the incident, there may be cases where the detection of interaction between multiple persons is required. Thus, the second embodiment will specifically explain the method of implementing the detection of interaction by using machine learning. Note that the term "interaction" as used in the second embodiment refers to a coordinated action between multiple persons, such as pick-pocketing or scuffle, in addition to the act of handing over baggage illustrated in FIG. 8.

For example, when a simple hunching over motion or a crouching down motion of a person is detected, considered may be a case where an on-site staff should be alerted to assist or approach that person. Nevertheless, if a nearby person runs away from the site, since there is a possibility that an assault or some or accident occurred at the site, it may be necessary to alert a security guard. If a hand-over act is conducted under the circumstances illustrated in FIG. 8 and independent action recognition is used, the hand-over act must be detected, for example, based on the "act of a person reaching for something" or the "act of a person pulling something close to himself/herself", and accurate determination will be difficult. Accordingly, in order to detect an incident in which recognition is difficult only with independent action recognition, it is necessary to detect an interaction. In the following explanation, explanation regarding the processing that is common with the first embodiment described above will be omitted, and only the differences between the second embodiment and the first embodiment will be explained.

Figure 9:
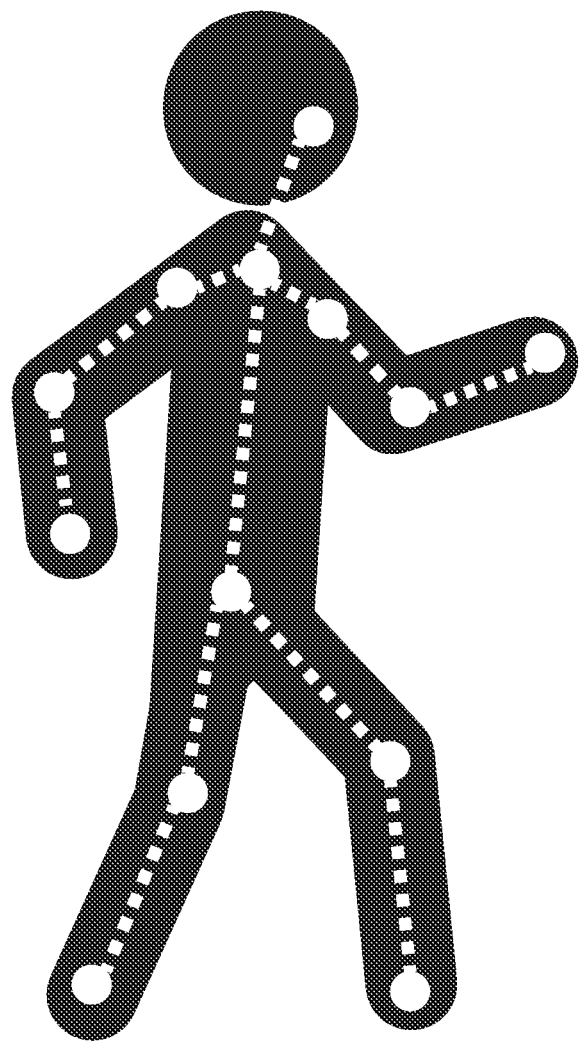
FIG. 9 is a diagram showing the skeletal frame detection result of the captured person.

Foremost, the target detection unit 3211 detects the target items of the captured person by applying the skeletal frame detection method. FIG. 9 is a diagram showing the skeletal frame detection result of the captured person. In FIG. 9, the circles are the respective joint positions estimated from the result of the skeletal frame detection. Moreover, in FIG. 9, the dotted lines are illustrated for showing the state of estimation, and this is not necessarily used as the feature quantity calculated by the feature extraction unit described later. In this embodiment, the joint positions to be acquired are shoulders, wrists, ankles and other key articulation nodes of a human body, and each of the skeletal frame points have two-dimensional coordinate data on the image.

Figure 10:
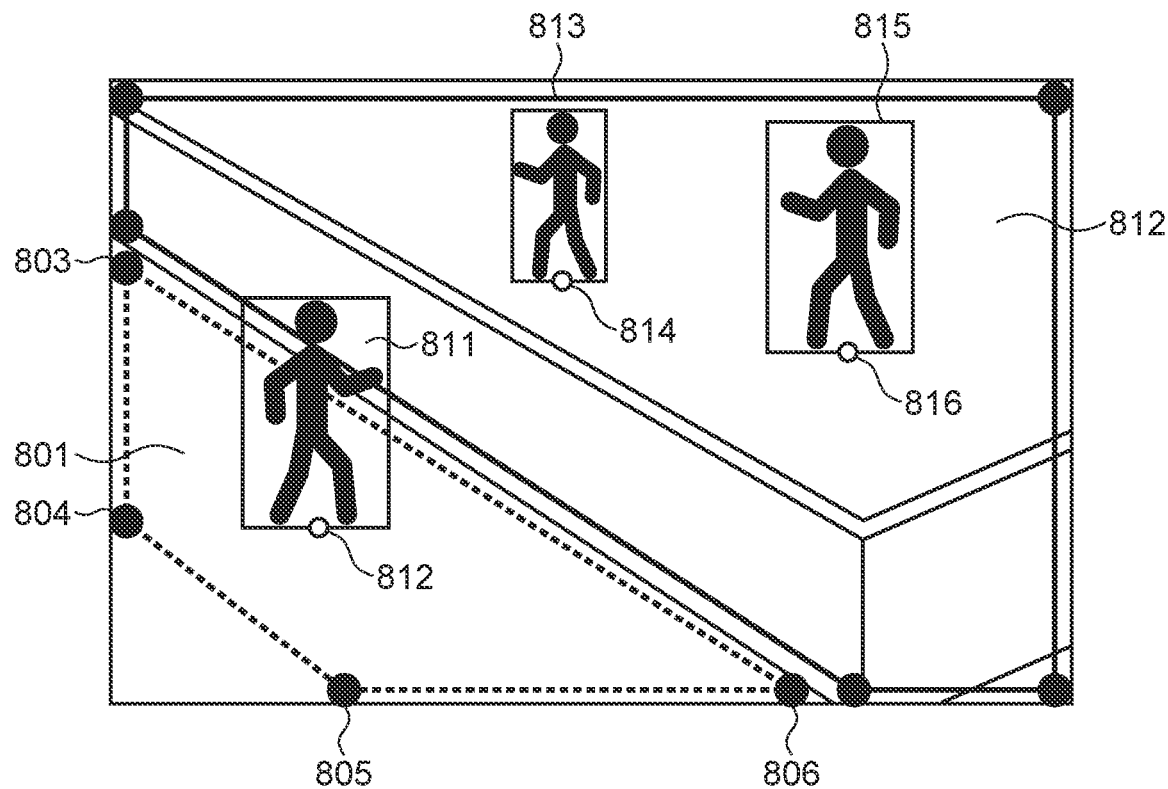
FIG. 10 is a diagram showing an area determination example of the captured person in this embodiment.

In the detection of interaction, for example, when detecting the hand-over of baggage in a manner of moving across the inside and outside of the security area, it is also necessary to perform area determination for determining in which area each captured person is positioned. FIG. 10 is a diagram showing an area determination example of the captured person in this embodiment. When an area 801 enclosed with a dotted line is the "detection target area A1", and an area 802 enclosed with a solid line is the "detection target area A2", the hand-over of baggage which moves across the "detection target area A1" and the "detection target area A2" is set as a detection target on the one hand, and the hand-over of baggage within the same area, such as within the "detection target area A1" or within the "detection target area A2", is excluded from a detection target. The area setting of the detection target area is performed based on the coordinates on the image. For example, the "detection target area A1" is set as an area enclosed by a polygonal shape drawn clockwise or counterclockwise by acquiring the coordinates of the four points of a point 803, a point 804, a point 805, and a point 806. The coordinates may be described in a configuration file prepared by the manager, or drawn using the GUI. Moreover, while the area setting is desirably operated using a fixed camera, when changing and operating the imaging area using a PTZ camera, area setting corresponding to each PTZ setting should be performed in advance. Otherwise, the area setting may be updated according to the PTZ level based on the conversion of image coordinates and world coordinates.

Next, the area where the captured person is positioned is determined in each estimated area of the captured person. Here, illustrated is an example of determining the area based on which area the coordinates of the middle point of the estimated position of both ankles are positioned. Otherwise, knees or waist, or center of gravity of the body, may also be used. In the example of FIG. 10, for instance, the middle point of the estimated position of both ankles of the person 811 is the coordinate 812 and, since such coordinate is positioned in the "detection target area A1", it is determined that the person 811 is positioned in the "detection target area A1". Similarly, it is determined that the person 813 is positioned in the "detection target area A2" based on the coordinate 814, and that the person 815 is positioned in the "detection target area A2" based on the coordinate 816, respectively.

Next, the feature extraction unit 3212 performs feature extraction for inputting the features of all persons determined to exist in both of the designated areas to the learning model of machine learning from the two-dimensional coordinate data on the image.

As the feature quantity based on the skeletal frame, used may be a coordinate set in which, as one point among the articulation nodes indicating the skeletal frame as a reference, coordinates of other articulation nodes are converted into relative coordinates relative to the reference point. Otherwise, an aggregate of norms or angles obtained by performing polar conversion may also be used as the feature quantity. Moreover, depending on the distance of the captured person from the camera, the norms thereof may change. In order to prevent the influence from such change of norms, the respective norms may be normalized by using the size of the rectangular area of each captured person.

Moreover, in the detection of interaction, it would also be effective, when performing the determination, to measure the relative distance relationship between the respective body parts between the persons. FIGS. 11A and 11B are diagrams showing the relative distance relationship of each body part between the persons. In particular, FIG. 11A shows the state at time t which is immediately before the hand-over in the act of handing over baggage, and FIG. 11B shows the state at time t+τ which is the moment of the hand-over in the act of handing over baggage. FIGS. 11A and 11B illustrate the correspondence relation between the heads, between the wrists, and between the ankles of a person 91 and a person 92. For example, a line segment 93 and a line segment 96 show the correspondence relationship between the heads, a line segment 94 and a line segment 97 show the correspondence relationship between the wrists, and a line segment 95 and a line segment 98 show the correspondence relationship between the ankles, and the feature quantity is calculated based on the distance between the foregoing body parts. For example, in the case of handing over baggage, the distance between wrists (line segment 94 and line segment 97) will probably become shorter in comparison to the distance between heads (line segment 93 and line segment 96) and the distance between ankles (line segment 95 and line segment 98) of the person 91 and the person 92. When comparing FIGS. 11A and 11B, while the change in the distance between heads and the distance between ankles are small on the one hand, it can be understood that the distance between wrists in FIG. 11B illustrating the moment of hand-over is particularly small. Accordingly, the use of the relative distance relationship between persons based on the skeletal frame points of the entire body as the feature quantity is considered to function effectively for identification.

If, for instance, only the distance between wrists is used, since it may lead to a misdetection where persons whose wrists overlapped by accident in the far-near direction relative to the camera are detected as possibly conducting a hand-over act, it is effective to utilize the skeletal frame points of the entire body. Note that, while the feature calculation based on a relative distance between same body parts such as between heads and between wrists was illustrated above, the feature quantity may also be calculated based on a relative distance of different body parts between persons such as a distance between the head of the person 91 and the wrist of the person 92.

Moreover, in addition to information based on a person's skeletal frame, it is also possible to calculate information of the article that is being handed over, and use the calculated information for determining an interaction that used such article, such as the hand-over of baggage or theft. In the foregoing case, a suitcase or a backpack is detected based on deep learning or other methods, and the person and the article in that person's possession are linked based on a combination with the person detection method including skeletal frame detection. Subsequently, for instance, when an article that is determined to have been in the possession of the person 91 is subsequently determined to be in the possession of the person 92 after a given period of time, it is possible to determine that an interaction using that article was conducted between these persons.

When detecting a hand-over act, since the act of handing over baggage within the same area is tolerated, the incident detection unit 3221 performs incident detection determination only for all pairs of persons positioned in different areas. For example, since it has been determined that the person 811 and the person 813, and the person 811 and the person 815, are respectively positioned in the "detection target area A1" and the "detection target area A2" based on the area determination, whether an incident has been detected is determined. Meanwhile, since it has been determined that the person 813 and the person 815 are both positioned in the "detection target area A2" based on the area determination, incident detection determination is not performed. In the case of any other detection of interaction, incident detection determination is performed between all persons or for all pairs of persons positioned in the area designated based on other area setting standards. However, when the foregoing relative distance is calculated between all persons, persons for which the relative distance exceeded a predetermined threshold may be excluded from the target of incident detection.

The incident and the site of occurrence thereof, as well as the determination accuracy thereof, are obtained by inputting the feature quantity calculated with the feature extraction unit 3212 to the incident detection unit 3221. When obtaining the foregoing information, an AI model such as deep learning or machine learning based on an SVM or a decision tree is used. However, as described above, a rule-based determination method may also be used. For example, in the case of detecting an act of handing over baggage, when it is determined that hands are approaching from the respective areas in a manner of moving across the inside and outside of the security area and that the distance between the hands is equal to or less than a predetermined threshold, it can be determined that an act of handing over baggage has occurred.

As described above, the video surveillance system 1 according to the second embodiment is able to determine an interaction between persons such as an act of handing over baggage, pick-pocketing or scuffle by calculating the feature quantity based on human skeletal frame detection, and performing incident detection determination by using machine learning. When an interaction is detected, the event calculation unit 3222 of the subsequent stage is used to select the event by referring to the surveillance information standard 332 preset by the manager, and notify the subjects to be alerted. Accordingly, the burden on the responder to respond to the detected incident can be reduced, and the performance of efficient security operations can be promoted.

As explained above, according to each of the foregoing embodiments, an image of a person and/or an object is detected from a video that captured a surveillance area, an incident feature quantity as a feature quantity representing a status of a detected person and/or a feature quantity of a detected object is calculated, an occurrence of an incident is detected based on the incident feature quantity, and subjects to be alerted of an occurred incident, which is a detected incident, are determined from a type of the occurred incident and a determination accuracy of the occurred incident. Thus, it is possible to realize an efficient alert process and improve the effectiveness of surveillance when surveilling various incidents that occur within the surveillance area.

Specifically, the video surveillance system according to the foregoing embodiment is characterized in that it identifies an event indicating a combination of the subjects to be alerted based on the type of the occurred incident and the determination accuracy of the occurred incident, and outputs the subjects to be alerted indicated in the identified event. Moreover, the subjects to be alerted include a responder (for example, on-site staff or security guard) to respond to the occurred incident in the surveillance area, and a manager (for example, surveillance officer of the surveillance center) to manage a status of the surveillance area, and a part of the event indicates a combination which excludes the manager from the subjects to be alerted. Thus, the subjects to be alerted can be easily identified, and the burden of the manager can also be reduced.

Moreover, the video surveillance system according to the foregoing embodiment is characterized in that, when an input is a moving image, it uses human skeletal frame detection, and calculates a feature quantity representing a posture of a person calculated from an estimation result of a skeletal frame based on the human skeletal frame detection, and a feature quantity representing an amount of movement of a skeletal frame by concurrently using a previous image frame and a subsequent image frame, and uses the feature quantities integrally.

Moreover, the video surveillance system includes a storage unit which stores surveillance standard information to be referenced for outputting the subjects to be alerted based on the occurred incident and the determination accuracy of the occurred incident, and the determination unit includes a surveillance importance determination unit, and determines surveillance importance prescribed for each type of the incident based on a surveillance importance determination standard set in the surveillance standard information.

Furthermore, the determination unit includes an event determination unit, and determines an event from the occurred incident type or the surveillance importance, and the determination accuracy of the occurred incident, based on an event determination standard set to the surveillance standard information.

Furthermore, the determination unit includes a subject to be alerted determination unit, and determines the subjects to be alerted from the event based on a subject to be alerted determination standard set to the surveillance standard information.

As a result of adopting the foregoing configurations, it is possible to promptly and properly select the subjects to be alerted who are suitable for dealing various types of incidents and situations.

Moreover, the video surveillance system according to the second embodiment detects an incident based on an interaction, which is a coordinated action between multiple persons in the surveillance area, by using a video that captured the surveillance area.

Specifically, the video surveillance system according to the second embodiment uses one type or multiple types of distances between body parts between persons for detection of interaction regarding the feature quantity to be calculated based on the skeletal frame of the detected person. Otherwise, the video surveillance system according to the second embodiment may also estimate, from a detection result of a person and an article, which person is in possession of the article for detection of interaction, and determine an interaction between persons via the article based on that information. Based on the foregoing processing, the video surveillance system according to the second embodiment can detect, with a high accuracy, an incident involving multiple persons.

Note that the present invention is not limited to the embodiments described above, and includes various modified examples. For example, the foregoing embodiments were explained in detail for explaining the present invention in an easy-to-understand manner, and the present invention does not need to necessarily comprise all of the configurations explained in the embodiments. Moreover, a part of the configuration of a certain embodiment may be replaced with the configuration of another embodiment, and the configuration of another embodiment may be added to the configuration of one embodiment. Moreover, another configuration may be added to, deleted from or replaced with a part of the configuration of each embodiment. Moreover, a part or all of the respective configurations, functions, processing units, and processing means described above may be realized with hardware such as an integrated circuit. Moreover, the respective configurations, functions and the like described above also be realized with software as a result of a processor interpreting and executing programs that realize each of the functions. The information of programs, data and files for realizing the respective functions may be recorded in a memory, a hard disk, an SSD (Solid State Drive) or any other recording device, or may otherwise be recorded on an IC card, an SD card, a DVD or any other recording medium.

REFERENCE SIGNS LIST

1 . . . video surveillance system, 2 . . . imaging system, 3 . . . video analysis system, 4 . . . surveillance center system, 21 . . . camera, 31 . . . image input unit, 32 . . . image processing unit, 33 . . . storage unit, 41 . . . recording unit, 42 . . . image display unit, 43 . . . management control unit, 321 . . . calculation unit, 322 . . . determination unit, 323 . . . output control unit, 331 . . . area information, 332 . . . surveillance standard information, 3211 . . . target detection unit, 3212 . . . feature extraction unit, 3221 . . . incident detection unit, 3222 . . . event calculation unit, 3321 . . . surveillance importance determination standard, 3322 . . . event determination standard, 3323 . . . subject to be alerted determination standard, 32221 . . . surveillance importance determination unit, 32222 . . . event determination unit, 32223 . . . subject to be alerted determination unit

The invention claimed is:

1. A video surveillance system for detecting a plurality of incidents in a surveillance area using a video that captured the surveillance area, comprising:
a memory storing at least one program; and
a processor, which when executing the at least one program, configures the processor to:
detect an image of a person and/or an object from the video, and calculate an incident feature quantity as a feature quantity representing a status of a detected person and/or a feature quantity of a detected object;
detect an occurrence of an incident based on the incident feature quantity, and determine subjects to be alerted of an occurred incident, which is a detected incident, from a type of the occurred incident and a determination accuracy of the occurred incident; and
identify an event indicating a combination of the subjects to be alerted based on the type of the occurred incident and the determination accuracy of the occurred incident, and output the subjects to be alerted indicated in the identified event,
wherein the subjects to be alerted include a responder to respond to the occurred incident in the surveillance area, and a manager to manage a status of the surveillance area, and a part of the event indicates a combination which excludes the manager from the subjects to be alerted.

2. The video surveillance system according to claim 1, wherein, when an input to the video surveillance system is a moving image and human skeletal frame detection is to be used for determining an incident of a person, the processor is further configured to calculate a feature quantity representing a posture of a person calculated from an estimation result of a skeletal frame based on the human skeletal frame detection, and a feature quantity representing an amount of movement of a skeletal frame by concurrently using a previous image frame and a subsequent image frame, and using the feature quantities integrally.

3. The video surveillance system according to claim 1, wherein the video surveillance system includes a storage unit which stores surveillance standard information to be referenced for outputting the subjects to be alerted based on the occurred incident and the determination accuracy of the occurred incident, and
wherein the processor is further configured to determine surveillance importance prescribed for each type of the incident based on a surveillance importance determination standard set in the surveillance standard information.

4. The video surveillance system according to claim 3, wherein the processor is further configured to determine an event from the occurred incident type or the surveillance importance, and the determination accuracy of the occurred incident, based on an event determination standard set to the surveillance standard information.

5. The video surveillance system according to claim 4, wherein the processor is further configured to determine the subjects to be alerted from the event based on a subject to be alerted determination standard set to the surveillance standard information.

6. The video surveillance system according to claim 1, wherein the video surveillance system detects an incident based on an interaction, which is a coordinated action between multiple persons in the surveillance area, by using a video that captured the surveillance area.

7. The video surveillance system according to claim 6, wherein the processor is further configured to use one type or multiple types of distances between body parts between persons for detection of interaction regarding the feature quantity to be calculated based on a skeletal frame of the detected person.

8. The video surveillance system according to claim 6, wherein the processor is further configured to estimate, from a detection result of a person and an article, which person is in possession of the article for detection of interaction, and determine an interaction between persons via the article based on that information.

9. A video surveillance method for detecting a plurality of incidents in a surveillance area using a video that captured the surveillance area, comprising the steps of:

detecting an image of a person and/or an object from the video, and calculating an incident feature quantity as a feature quantity representing a status of a detected person and/or a feature quantity of a detected object;

detecting an occurrence of the incident based on the incident feature quantity;

determining subjects to be alerted of an occurred incident, which is a detected incident, from a type of the occurred incident and a determination accuracy of the occurred incident; and identifying an event indicating a combination of the subjects to be alerted based on the type of the occurred incident and the determination accuracy of the occurred incident, and outputting the subjects to be alerted indicated in the identified event, wherein the subjects to be alerted include a responder to respond to the occurred incident in the surveillance area, and a manager to manage a status of the surveillance area, and a part of the event indicates a combination which excludes the manager from the subjects to be alerted.

* * * * *